3 Sheets—Sheet 1.

J. Q. C. SEARLE.

MEANS FOR HEATING RAILWAY CARS.

No. 11,101. Reissued Aug. 5, 1890.

Witnesses:
J. A. Rutherford
Robert Ewett

Inventor:
John Q. C. Searle.
By James L. Norris.
Atty.

THE NORRIS PETERS CO., PHOTO-LITHO., WASHINGTON, D. C.

J. Q. C. SEARLE.

MEANS FOR HEATING RAILWAY CARS.

No. 11,101. Reissued Aug. 5, 1890.

Witnesses:

J. A. Rutherford

Robt. Ewett

Inventor:

John Q. C. Searle.

By James L. Norris.

Atty.

THE NORRIS PETERS CO., PHOTO-LITHO., WASHINGTON, D. C.

3 Sheets—Sheet 3.

J. Q. C. SEARLE.

MEANS FOR HEATING RAILWAY CARS.

No. 11,101. Reissued Aug. 5, 1890.

Witnesses:
J. A. Rutherford.
Robt Ewett.

Inventor:
John Q. C. Searle.
By James L. Norris.
Atty.

THE NORRIS PETERS CO., PHOTO-LITHO., WASHINGTON, D. C.

BEST AVAILABLE COPY

UNITED STATES PATENT OFFICE.

JOHN Q. C. SEARLE, OF CHICAGO, ILLINOIS.

MEANS FOR HEATING RAILWAY-CARS.

SPECIFICATION forming part of Reissued Letters Patent No. 11,101, dated August 5, 1890.

Original No. 370,897, dated October 4, 1887. Application for reissue filed November 9, 1889. Serial No. 329,827.

*To all whom it may concern:*

Be it known that I, JOHN Q. C. SEARLE, a citizen of the United States, residing at Chicago, in the county of Cook and State of Illinois, have invented new and useful Improvements in Means for Heating Railway-Cars, of which the following is a specification.

The object of my invention is to provide a safe, cleanly, and economical method of railway-car heating by the use of oil, whereby the heat can be readily regulated from time to time, as required, and the annoyance of dust and ashes incident to the employment of ordinary stoves avoided, as well as danger from fire or explosion in case of collision, overturning of the car, or like accident.

The invention consists in the combination, with an oil-stove, of a main reservoir located beneath the car, an intermediate feed-tank above the roof, and pipe-connections for conveying oil from the main lower reservoir to the upper feed-tank, and thence to the stove, and also for returning the overflow of the feed-tank to the reservoir, said pipes being provided with suitable means for controlling the flow of oil, and the tank and reservoir being furnished with automatic valves for preventing the escape of oil in case said receptacles should become accidentally displaced.

The invention also consists in a water heating and circulating apparatus embodying certain novel features of construction, which will be hereinafter set forth.

Figure 1:
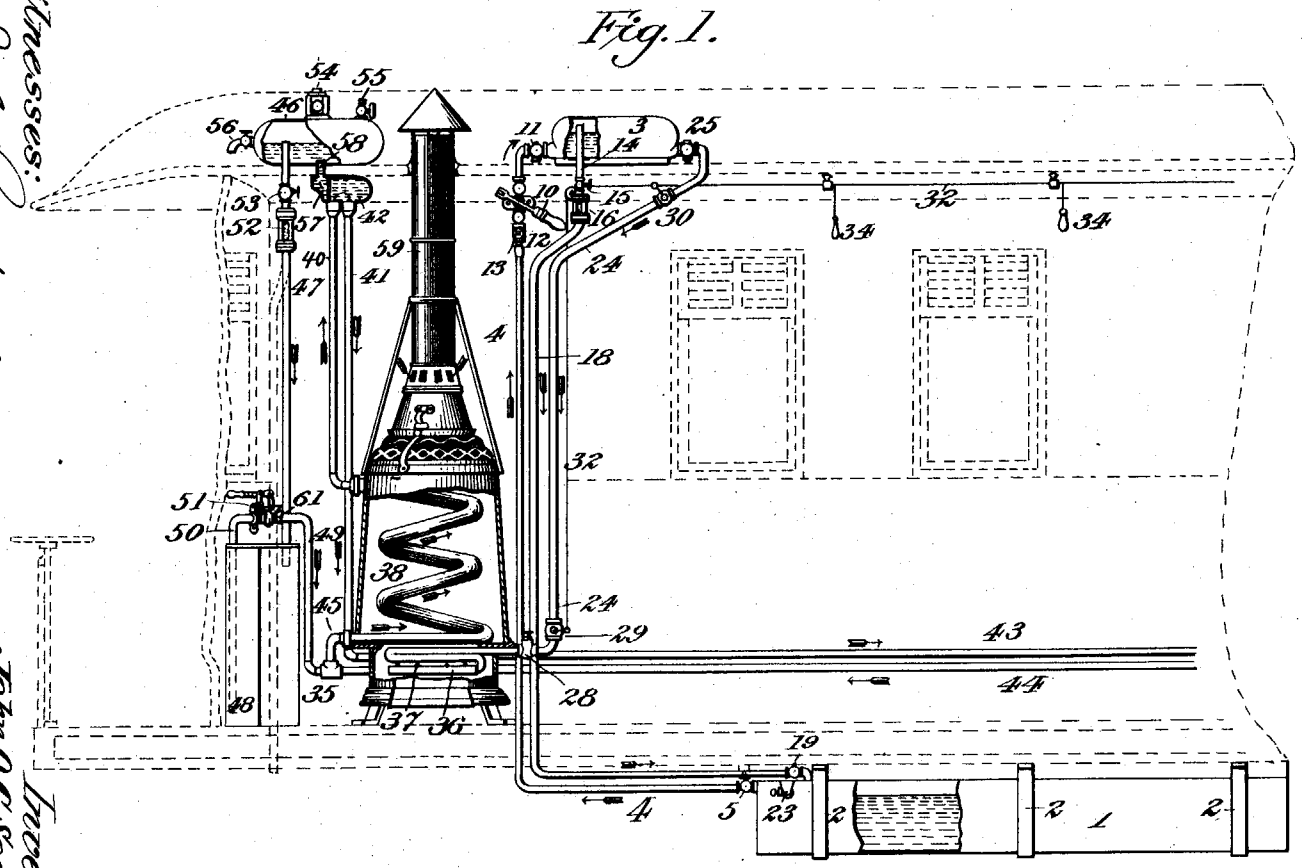
Figure 2:
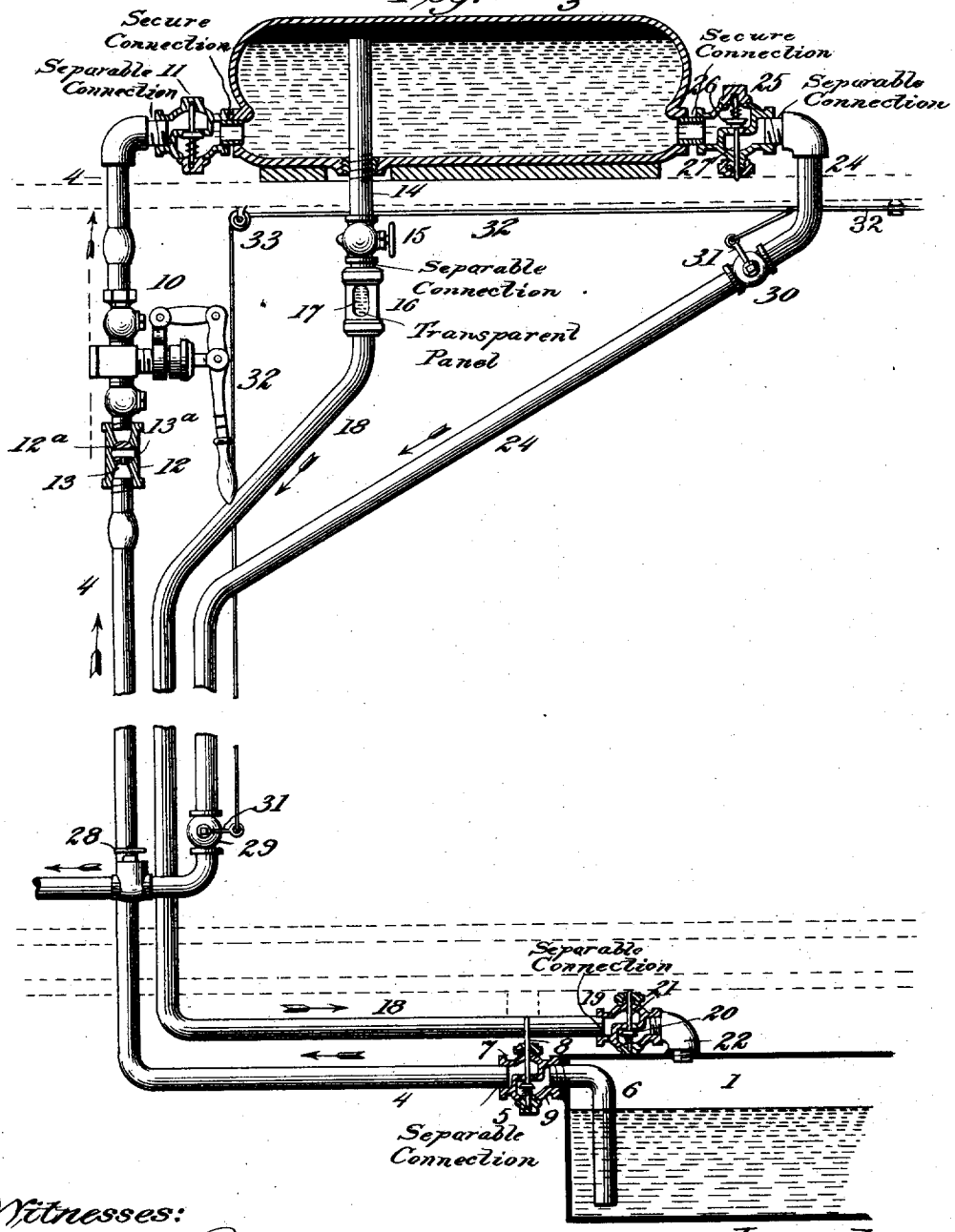
Figure 3:
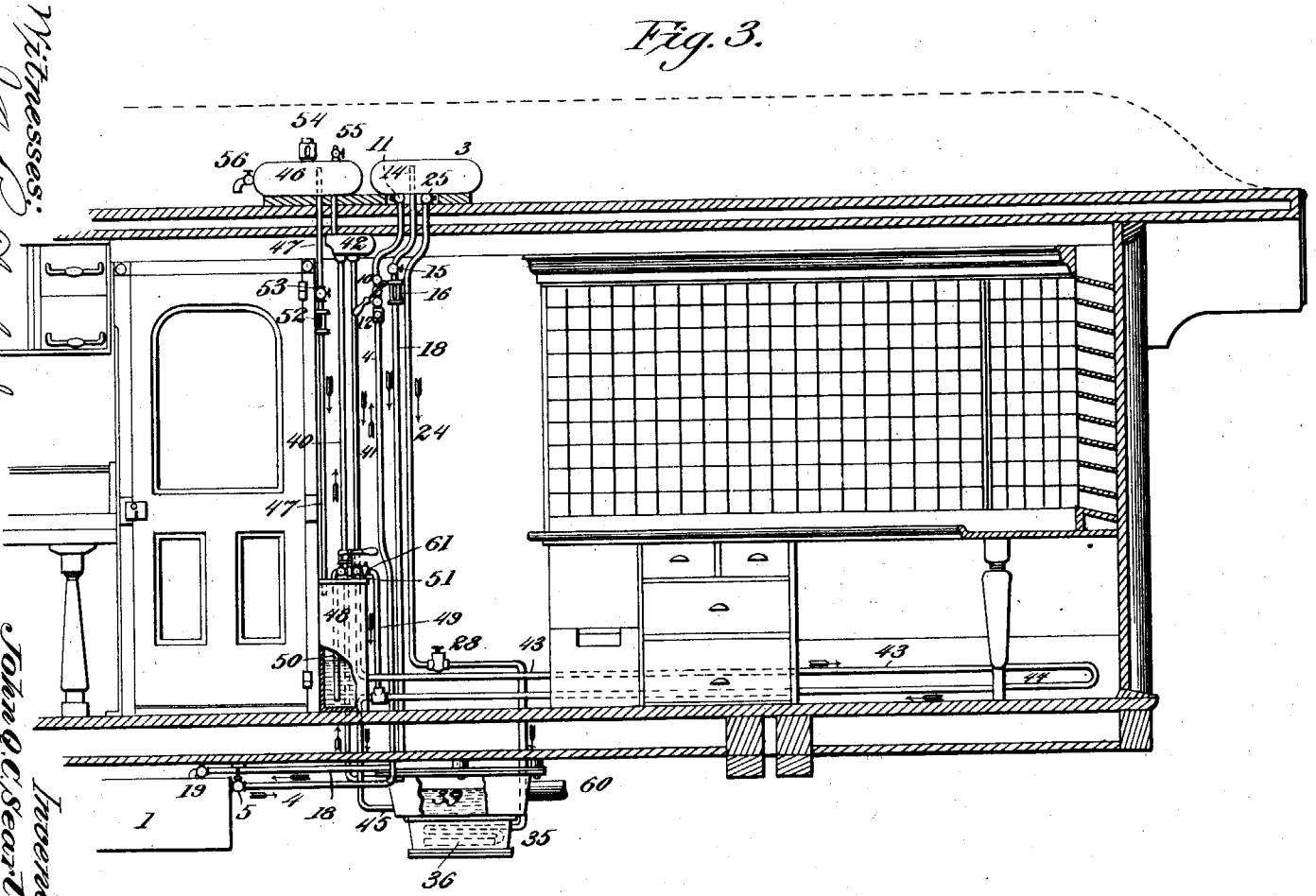

In the annexed drawings, illustrating the invention, Figure 1 represents partly in sectional elevation a view of a car-heating apparatus embodying my improvements, the car being shown in dotted lines. Fig. 2 is an enlarged view in side elevation of my improved apparatus for carrying a supply of oil beneath and above a railway-car and for feeding it from the lower reservoir to the upper feed-tank and thence to the stove. Fig. 3 illustrates the application of my improved heating apparatus to a railway postal car.

Referring to the drawings, the numeral 1 designates an oil tank or reservoir that is supported beneath a railway-car by means of hangers 2, or otherwise, in any convenient manner. This tank or reservoir is preferably made of metal and may have such capacity as to permit its containing a sufficient supply of oil for an extended trip. Being located beneath the car, as shown, the tank 1 will be out of the way and may be made of large size without involving the carriage of any considerable quantity of oil within the car. In order to provide, however, for a proper feed of oil to the stove, an auxiliary or intermediate oil-tank 3, is arranged above the roof, or the oil-tank 3 may be placed at any suitable or convenient elevation within the car.

Oil is conveyed from the reservoir 1 to the tank 3 through a pipe 4, the lower end of which is connected to a valve-case 5, that is secured to a pipe 6, which passes through one end of the reservoir 1 and extends to near its bottom. The valve-case 5 contains a check-valve 7, that is normally in an open position by reason of its stem 8 being supported at one end against some fixed portion of the car or in any other convenient manner. On the opposite end of the valve-stem 8 is a spring 9, by which the valve is automatically closed whenever the valve-stem is removed from its fixed support, thus avoiding waste of oil in case the reservoir 1 should be accidentally displaced or disconnected from the car.

The pipe 4 connects at a convenient point with a pump 10 or other suitable suction and forcing device of any approved construction, by which oil is forced into the upper tank 3 against the pressure of a spring-seated check-valve 11, located externally at one end or side of said tank. Beneath the pump 10 is a hand cock or valve 12, that is closed after oil has been pumped into the upper tank, and this cock 12 has a vent 13, that opens in line with the pipe 4 and communicates through the cock with an air-inlet $13^a$ in the casing $12^a$, as shown in Fig. 2, so as to permit the return of oil from beneath the pump to the reservoir when said cock is closed.

The tank 3 has a vertical overflow-pipe 14, the lower end of which connects with a hand-valve 15. The casing of this hand-valve 15 is connected beneath to a pipe-section or chamber 16, having a transparent panel 17, and the lower end of the chamber or pipe-section 16 is connected to a return-pipe 18, through which overflow oil from the tank 3 is conveyed to the reservoir 1 beneath the car. The lower end of pipe 18 is connected to a valve-casing 19, located above or at the side of the oil-reservoir 1, and containing a spring-seated check-valve 20, that is held normally open by having the end of its stem 21 supported against some fixed portion of the car in the manner already described when referring to the check-valve 5 between the pipe 4 and reservoir. The overflow oil from the tank 3 and pipe 18 passes through the valve-casing 19 and a bend 22, and thence into the reservoir beneath the car. The valve-casings 5 and 19 are preferably joined to the pipes 4 and 18, respectively, by means of lead or other separable connections, the attachment of said valve-casings to the reservoir being more firm and secure, so that in case the oil-reservoir 1 becomes accidentally displaced or detached the valve-casings will become disconnected on the sides next to the pipes 4 and 18, and as the valve-stems are thus relieved of their support they will automatically close under the action of their springs, thereby preventing waste of oil from the reservoir.

In pumping oil into the tank 3 from the reservoir 1 the car porter or other attendant will see that the valves 12 and 15 are open, and while pumping will watch the transparent panel 17 in the pipe-section or chamber 16 that communicates with the overflow-pipes. As soon as he detects any flow of oil downward through the chamber 16 he will know that the tank 3 is filled to the level of the overflow-pipe 14, and will then cease pumping, at the same time closing the hand-valves 12 and 15. Whenever it is desired to know whether the upper tank 3 is filled, it is only necessary to open the hand-valve 15 long enough to empty the small quantity of oil that may remain in the pipe 14, and if after a short interval no more oil is seen passing the transparent panel 17, it will be known that the level of the oil in the tank 3 is below the top of said pipe 14, whereupon the valve 12 should be opened and the pump 10 operated until a flow of oil is again seen through the transparent panel. The pump is then stopped and the valves 12 and 15 closed, as before. The condition of the oil-tank 3 as to its supply is thus readily ascertained and controlled.

The oil-reservoir 1 beneath the car may be filled through a valved funnel 23, or in any other convenient manner.

The stove is supplied with oil from the tank 3 through a small pipe 24, that connects with a valve-casing 25, which is located externally to said tank at one end or side and communicates therewith. The valve-casing 25 contains a spring-actuated check-valve 26, the stem 27 of which bears at one end against the car-roof or other fixed point, and so holds the valve open. The valve-casing 25 is connected more securely to the tank 3 than it is to the pipe 24, so that in case of accidental displacement of the tank the separation will be between the valve-casing and pipe 24, and the valve will close automatically by the removal of support from its valve-stem, thus preventing the escape of oil from the tank. The valve-casing 11 at the opposite end of the tank is also more firmly connected to the tank than to the pipe 4, so that accidental separation will occur between the valve 11 and pipe 4 sooner than between the valve and tank. The overflow-pipes 14 and 18, with intermediate valve 15, are also arranged in such a way that separation will occur below said valve rather than above it. It will thus be seen that in case of accident from collision or otherwise the tank-connections are so arranged as to prevent injury from escape of oil.

In the pipe 24 that conveys oil to the stove is a hand-valve 28, that is opened when the fire is started and closed when it is to be extinguished. By this valve 28 the heat of the stove may also be regulated by controlling the supply of oil admitted to the burners. The pipe 24 is also provided with two safety cut-off valves 29 and 30. These valves are actuated through arms 31, to each of which is attached a pull-cord 32, that is passed over a pulley or pulleys 33, and provided with drop-handles 34, the cord being extended through the car beneath the ceiling, so as to be accessible for closing the valves 29 and 30, and thereby instantly extinguishing the fire in the stove in case of accident.

With the above-described apparatus for holding or carrying an oil-supply and for conveying it from a lower to an upper tank and thence to the stove, as well as controlling the flow or feed of the oil and guarding against accidents, it will be found that railway-cars and dwellings or other buildings can be safely, economically, and conveniently heated with the aid of an oil stove or stoves of any approved construction.

In a railway-car the stove 35 may be placed within the car in the usual manner, as shown in Fig. 1, or it may be placed beneath the car, as represented in Fig. 3, the latter arrangement being preferable in postal cars or where it is desired to economize space. The oil-stove 35 is provided with a coil 36, having suitable jets 37, where the oil is ignited. It may also contain a water-coil 38, as shown in Fig. 1, or be provided with a water-chamber 39, as seen in Fig. 3.

The water that is heated in the coil 38 or the chamber 39, as the case may be, is circulated through the vertical pipes 40 and 41, connected at the top by what I term a "special fitting" 42, thence down through the pipe 41 and horizontal pipes 43 and 44, said horizontal pipes being arranged around the car near its floor in any convenient manner, and is finally returned through a bend 45 to the lower leg of the coil 38, as seen in Fig. 1, or to the water-heating chamber 39, as shown in Fig. 3. The special fitting 42 communicates with a water and steam drum 46, located in the upper part of the car and having an overflow-pipe 47, that may lead to a water-tank 48 within the car.

If desired, the tank 48 may be omitted and the overflow or waste pipe 47 be conducted to the exterior of the car, as shown by dotted lines in Fig. 1. The upper end of this overflow-pipe 47 extends into and above the bottom of the drum or expansion-chamber 46 to the water-level thereof, as shown.

The water-tank 48 communicates with the circulating-pipes and with the heating-coil 38 or water-heating chamber 39 through pipes 49 and 50 and an intermediate pump 51, by operating which the drum 46, chamber 42, and connections can be given such additional supply of water as may be needed to replace any loss of water by leakage or otherwise.

Between the pump and pipe 49 is a hand-valve 61, which may be closed to protect the pump from the action of heated water when it is not in use. It will be understood that the water heating and circulating apparatus is supplied in the first instance by "pumping up" into the circulating-pipes in the ordinary manner, the tank 48, pump 51, and immediate connections being designed mainly to afford a means of supplying water to replace any waste while the car is in motion and without the necessity of cooling the water or removing the fire.

In the overflow or waste pipe 47 is a section having a transparent panel 52, and above this panel is a hand-valve 53, which may be opened while using the pump 51 and closed after pumping has ceased and the surplus water above the proper level has passed through the overflow or waste pipe 47 to the tank 48, or outside of the car, as may be preferred. When the water in the drum 46 has reached a proper level, the hand-valve 53 should be closed, when the apparatus will be in proper condition for use.

The drum 46 is provided with a safety-valve 54, a blow-off cock 55, and a rotatable funnel-cock 56, the latter being sometimes used for replenishing the drum when the car is in the yard out of service.

By means of the special fitting 42, that connects the upper ends of the pipes 40 and 41, the circulation is relieved of vapor and bubbles of air, an exit therefor being afforded through a perforated diaphragm 57 and pipe 58 to the water and steam drum 46. The special fitting 42 is made to serve as a connecting-chamber for the pipes 40 and 41, and is provided with an interior perforated diaphragm 57 near one end between the opening that communicates with the pipe 58 and the opening that communicates with the pipe 40. The perforated diaphragm 57 is thus so located as to permit a free circulation between the pipes 40 and 41, and while it obstructs a flow of water up through the pipe 58, it affords a sufficient exit to the expansion chamber or drum 46 for the passage of bubbles of air or vapor. Thus, while there is no circulation in the expansion chamber or drum 46, it is so connected with the circulating system as to be capable of relieving and controlling the pressure.

The stove 35 (shown in Fig. 1) may be of any suitable pattern for placing in the interior of a car, and is provided with an ordinary smoke-pipe 59, and with suitable draft-openings and heat-registers. In case of accident to the oil-feeding apparatus or lack of oil for fuel, the burner-coil 36 can be removed from the stove and an ordinary grate substituted for the support of coal or other fuel.

The oil-stove that is placed beneath the car, as shown in Fig. 3, may be supported by any suitable means, and is provided with a smoke-pipe 60, that is entirely outside of the car. This arrangement of stove is especially adapted for the requirements of postal cars by affording a largely-increased space for postal boxes and tables, as shown in Fig. 3, so that large quantities of mail-matter can be conveniently handled and stowed without danger from proximity to fire.

An especially valuable feature of my invention resides in the fact that the pipes for conveying the oil from the lower reservoir to the upper tank and thence to the stove, as well as the overflow-pipe from the tank to the reservoir, need not be of large diameter. Thus, as the main reservoir is located beneath the car and the intermediate feed-tank above the car-roof, the conveying-pipes being of small size, there will never be any considerable quantity of oil within the car. The pipes 4 and 18, moreover, are not in use except when filling the upper tank, the capacity of which may be limited, if desired, to a supply sufficient for one day or one trip only.

The pipe 24, that connects the tank 3 with the stove, is particularly of small diameter, as the feed to the stove only needs to be gradual, and at the rate, say, of from forty to eighty drops per minute. This pipe 24 is besides provided with two safety cut-off valves 29 and 30, by which the flow of oil can be instantly arrested and the small quantity remaining in the pipe between said valves completely isolated from the oil in the tank 3 whenever required in case of fire or other accident.

It will be understood that I do not herein claim the combination of the special fitting 42 and drum or tank 46 with a hot-water heating and circulating apparatus, as such is embraced in my application of December 3, 1883, Serial No. 113,480.

Having thus described my invention, what I claim is—

1. The combination of an oil-stove, a main oil-reservoir, an intermediate oil-feed tank located above said stove and reservoir, a valved pipe for conveying oil from said reservoir to the upper feed-tank, a pump located in said pipe for forcing oil from the lower reservoir to the upper tank, a valved pipe for conveying oil from the upper feed-tank to the stove, and a valved overflow-pipe leading from the upper tank to the main reservoir, substantially as described.

2. The combination, with an oil-stove, of an oil-reservoir, an intermediate feed-tank located above said stove and reservoir, a pipe for connecting said reservoir and upper tank, a pump for forcing oil through said pipe from the lower reservoir to the upper feed-tank, a pipe for connecting said tank and stove, and an overflow-pipe for connecting the feed-tank and reservoir, said overflow-pipe being provided with a cock and transparent panel, substantially as described.

3. The combination of an oil-stove, an oil-reservoir, an intermediate feed-tank located above said stove and reservoir and provided with a valved inlet and a valved outlet, a pipe for connecting the lower reservoir and upper tank and provided with a pump for forcing oil, and a hand-valve located beneath said pump, a valved pipe for connecting the stove and intermediate feed-tank, and an overflow-pipe for connecting the upper feed-tank and lower reservoir, said overflow-pipe being provided with a cock and transparent panel, substantially as described.

4. The combination, with a railway-car, an oil-stove, an oil tank or reservoir, and oil-conveying pipes, of a spring-seated check-valve for controlling the escape of oil from said tank or reservoir, said check-valve being held normally open by pressure of its stem against some fixed support, but adapted to close automatically upon accidental displacement of the tank or reservoir, substantially as described.

5. The combination, with a water heating apparatus and circulating pipes, of an expansion-chamber, an overflow or waste pipe leading from the water-level of said chamber, and a hand-valve by use of which any surplus water may be removed while the apparatus is in use, substantially as described.

6. The combination, with a water heating apparatus and circulating system, of an expansion-chamber, an overflow or waste pipe leading from the water-level of said chamber, and a hand-valve for retaining the water at a proper level in said expansion-chamber while the apparatus is in use, substantially as described.

7. The combination, with a water heating apparatus and circulating pipes, of an expansion-chamber, an overflow-pipe leading from the water-level of said chamber, and a pump for replacing any loss of water in the circulating system, substantially as described.

8. The combination, with a water heating and circulating system, of an expansion-chamber, an overflow-pipe leading from the water-level of said chamber and provided with a cock and a transparent panel, and a pump for replacing any loss of water in the heating and circulating system, substantially as described.

9. The combination of a water-heating apparatus, circulating-pipes, an expansion-chamber connected with said circulating-pipes, a water-tank, an overflow-pipe for connecting said expansion-chamber and tank, a pipe for connecting the tank and circulating system, and a pump for forcing water from said tank to replace any loss of water in the heating or circulating system, substantially as described.

10. The combination of a water-heating apparatus, circulating-pipes 40, 41, 43, and 44, a special fitting 42, connecting the upper ends of the pipes 40 and 41, expansion-chamber 46, and pipe 58, connecting said expansion-chamber and special fitting, substantially as described.

11. The combination of a water-heating apparatus, circulating-pipes 40, 41, 43, and 44, a special fitting 42, connecting the upper ends of the pipes 40 and 41, the expansion-chamber 46, and pipe 58, connecting said expansion-chamber and special fitting, and an overflow or waste pipe leading from said expansion-chamber and controlled by a hand-valve, substantially as described.

12. The combination of a water-heating apparatus, circulating-pipes 40, 41, 43, and 44, a special fitting 42, connecting the upper ends of the pipes 40 and 41 and provided with a perforated diapragm 57, the expansion-chamber 46, pipe 58, connecting said expansion-chamber and special fitting, an overflow or waste pipe leading from said expansion-chamber, and a pump for replacing any loss of water in the circulating system, substantially as described.

In testimony whereof I have affixed my signature in presence of two witnesses.

JOHN Q. C. SEARLE.

Witnesses:
S. U. ROBY,
C. R. DUTTON.